US009761150B2

(12) United States Patent
Pang

(10) Patent No.: US 9,761,150 B2
(45) Date of Patent: Sep. 12, 2017

(54) HAIRDRESSING TRAINING AID

(75) Inventor: Kam Chiu Pang, Chengdu (CN)

(73) Assignee: Pivot Point International, Inc., Chicago, IL (US)

( * ) Notice: Subject to any disclaimer, the term of this patent is extended or adjusted under 35 U.S.C. 154(b) by 982 days.

(21) Appl. No.: 13/821,824

(22) PCT Filed: Dec. 17, 2010

(86) PCT No.: PCT/US2010/060934
§ 371 (c)(1),
(2), (4) Date: May 22, 2013

(87) PCT Pub. No.: WO2012/033508
PCT Pub. Date: Mar. 15, 2012

(65) Prior Publication Data
US 2013/0230828 A1    Sep. 5, 2013

(30) Foreign Application Priority Data
Sep. 10, 2010 (CN) .......................... 2010 1 0281165

(51) Int. Cl.
*G09B 19/00*      (2006.01)
*A45D 44/14*      (2006.01)

(52) U.S. Cl.
CPC ............ *G09B 19/00* (2013.01); *A45D 44/14* (2013.01); *G09B 19/0076* (2013.01)

(58) Field of Classification Search
USPC ........................................................ 434/94
See application file for complete search history.

(56) References Cited

U.S. PATENT DOCUMENTS

| | | | | |
|---|---|---|---|---|
| 4,016,917 A | * | 4/1977 | Victor ..................... | B60B 21/12 152/381.3 |
| 4,136,483 A | * | 1/1979 | Shackelford ............. | A63H 3/44 446/321 |
| 5,041,050 A | * | 8/1991 | Ritchey .................... | A63H 3/44 446/391 |
| 5,131,796 A | * | 7/1992 | Herum .................... | B60D 1/60 280/511 |
| 6,217,407 B1 | * | 4/2001 | Laursen ................... | A63H 3/44 446/394 |
| 6,527,618 B1 | * | 3/2003 | Faunda .................... | A63H 3/44 132/53 |
| 7,410,358 B2 | * | 8/2008 | Morehead ............. | A63H 3/365 434/94 |
| 2009/0275001 A1 | * | 11/2009 | Kubo ..................... | A45D 44/14 434/94 |

OTHER PUBLICATIONS

International Preliminary Report on Patentability dated Mar. 12, 2013, PCT/US2010/060934.

* cited by examiner

*Primary Examiner* — James Hull
(74) *Attorney, Agent, or Firm* — Reed Smith LLP

(57) ABSTRACT

A hairdressing training headform has features simulating a face and neck of a human. A flexible scalp with hair has a peripheral lip. A vertex is configured to simulate an upper portion of a human skull and has a periphery with which the peripheral lip of the scalp engages when the flexible scalp is placed over the vertex. A releasable locking means remote from the vertex periphery biases the vertex toward the headform such that the peripheral lip of the scalp is sandwiched between the vertex periphery and the headform.

15 Claims, 3 Drawing Sheets

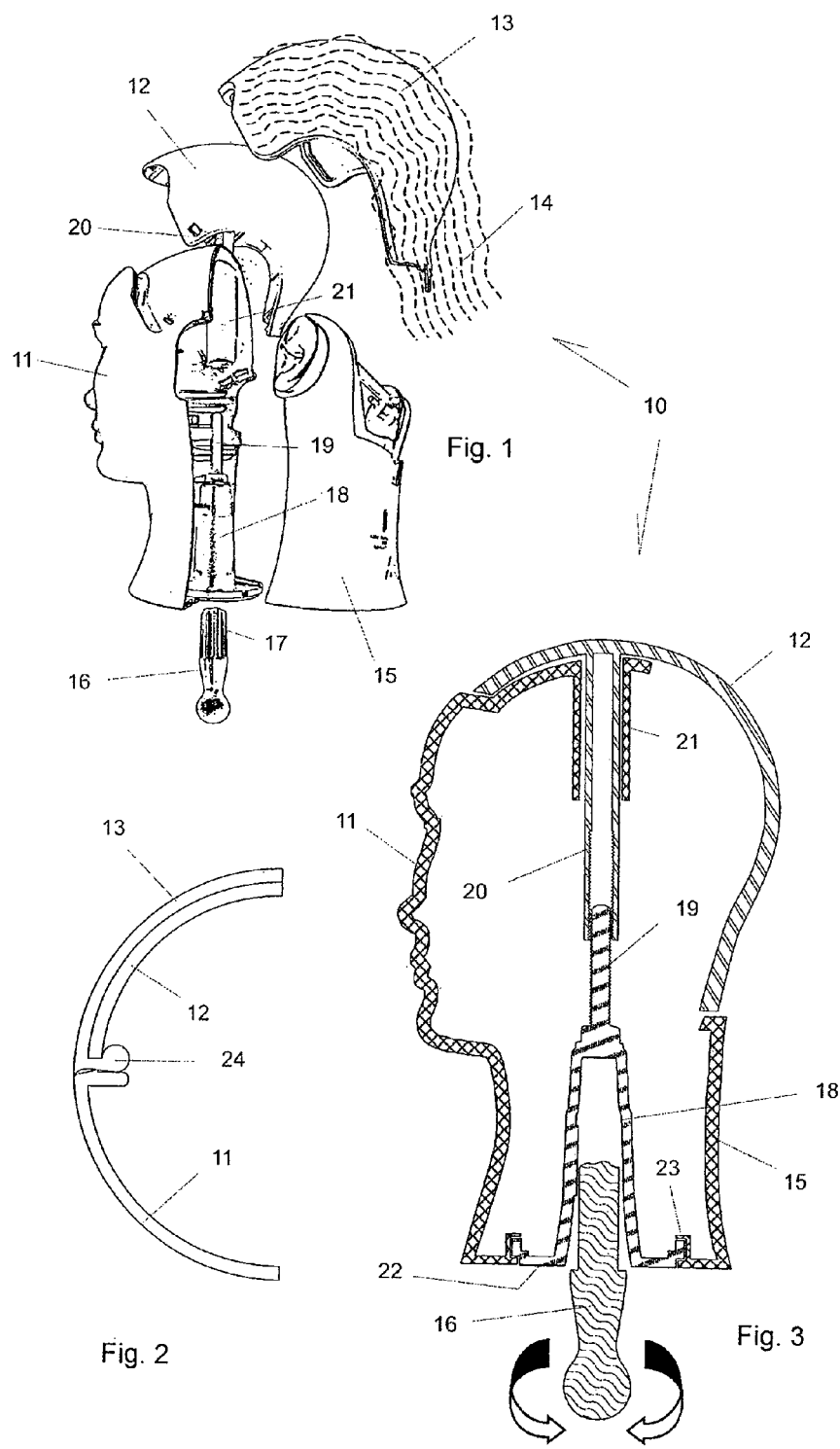

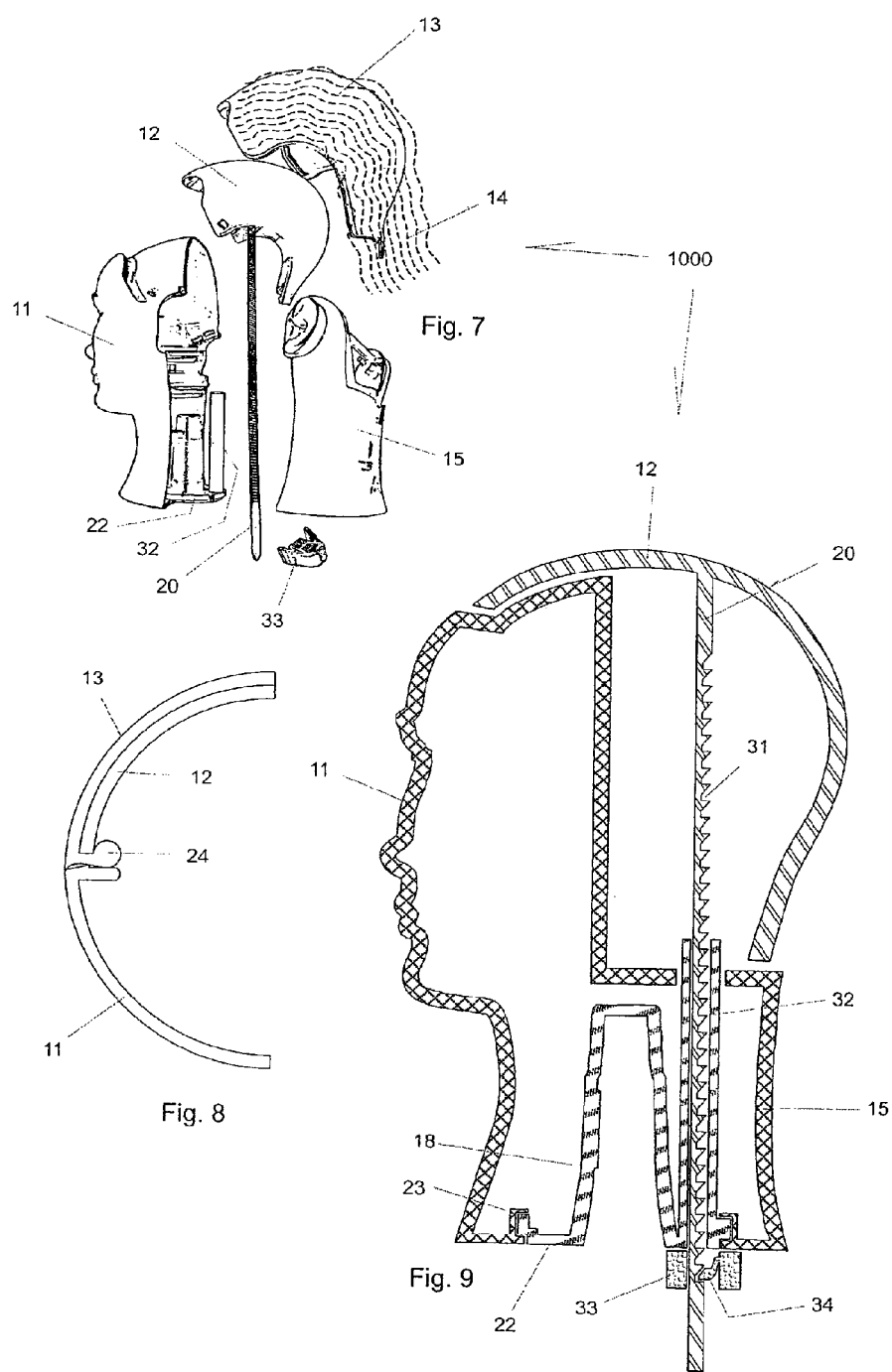

HAIRDRESSING TRAINING AID

CROSS-REFERENCE TO RELATED APPLICATIONS

This is a national stage patent application of PCT/US2010/060934, filed on Sep. 10, 2010, which is incorporated by reference in its entirety.

BACKGROUND OF THE INVENTION

The present invention relates to a training aid for hairdressers. The invention more particularly, although not exclusively, relates to hairdressing training headform having a means of securely retaining and conveniently releasing an artificial scalp with hair for interchangeability.

It is known to secure a PVC scalp with hair to a hairdressing headform in which the vertex (being that portion of the headform immediately covered by the scalp) is a permanent fixture of the overall headform. The scalp must be attached securely to the vertex so that hairdressing trainees can pull on the hair and manipulate it without the scalp becoming detached from the vertex in use. The requirement for secure attachment of the PVC skin to the vertex is in conflict with a desire that the PVC scalp be easily removed when desired for exchange with another scalp perhaps having hair of a different type.

OBJECTS OF THE INVENTION

It is an object of the present invention to overcome or substantially ameliorate at least one of the above disadvantage and/or more generally to provide an improved hairdressing training headform.

DISCLOSURE OF THE INVENTION

There is disclosed herein a hairdressing training aid, comprising:
a headform having features simulating a face and neck of a human;
a flexible scalp with hair, the scalp having a peripheral lip;
a vertex configured to simulate an upper portion of a human skull and having a periphery with which the peripheral lip of the scalp engages when the flexible scalp is placed over the vertex; and
releasable locking means remote from the vertex periphery and biasing the vertex toward the headform such that the peripheral lip of the scalp is sandwiched between the vertex periphery and the headform.

Preferably, the releasable locking means comprises a threaded shaft and a threaded rod engaging therewith, one of which extends from the headform and the other of which extends from the vertex, relative rotation between the threaded shaft and threaded rod causing relative movement of the vertex with respect "to the headform.

Preferably, the hairdressing training aid further comprises a recess with a base into which a key can be inserted for attachment of the headform to a stand.

Preferably, the threaded rod extends from the recess.

Preferably, the recess is rotatable with respect to the headform.

Alternatively, the releasable locking means can comprise a catch extending from the vertex and a latch located within the headform with which the catch engages.

Preferably, the latch is flexible to enable it to deform upon engagement with the catch as the vertex is attached to the headform and is mounted within the headform to slide away from the catch for release of the vertex.

A release pin can extend from the latch for access at the headform exterior to enable the above mentioned sliding movement.

As a further alternative, the releasable locking means can comprise a gear rack extending from the vertex and a ratchet bearing against the headform and with which the gear rack engages.

The hairdressing training aid can further comprise a guide tube within the headform and through which the gear rack extends en route to the ratchet.

Preferably, the ratchet is external of the headform.

BRIEF DESCRIPTION OF THE DRAWINGS

Preferred forms of the present invention will now be described by way of example with reference to the accompanying drawings, wherein:

FIG. 1 is a schematic parts-exploded perspective illustration of a hairdressing training headform;

FIG. 2 is a schematic partial cross-sectional elevation of a portion of the headform of FIG. 1;

FIG. 3 is a schematic cross-sectional elevation of the headform;

FIG. 7 is a schematic parts-exploded perspective illustration of another hairdressing training headform;

FIG. 8 is a schematic cross-sectional elevation of a portion of the headform of FIG. 7; and FIG. 9 is a schematic cross-sectional elevation of the headform of FIG. 7.

DESCRIPTION OF THE PREFERRED EMBODIMENTS

Figures 4, 5, 6:
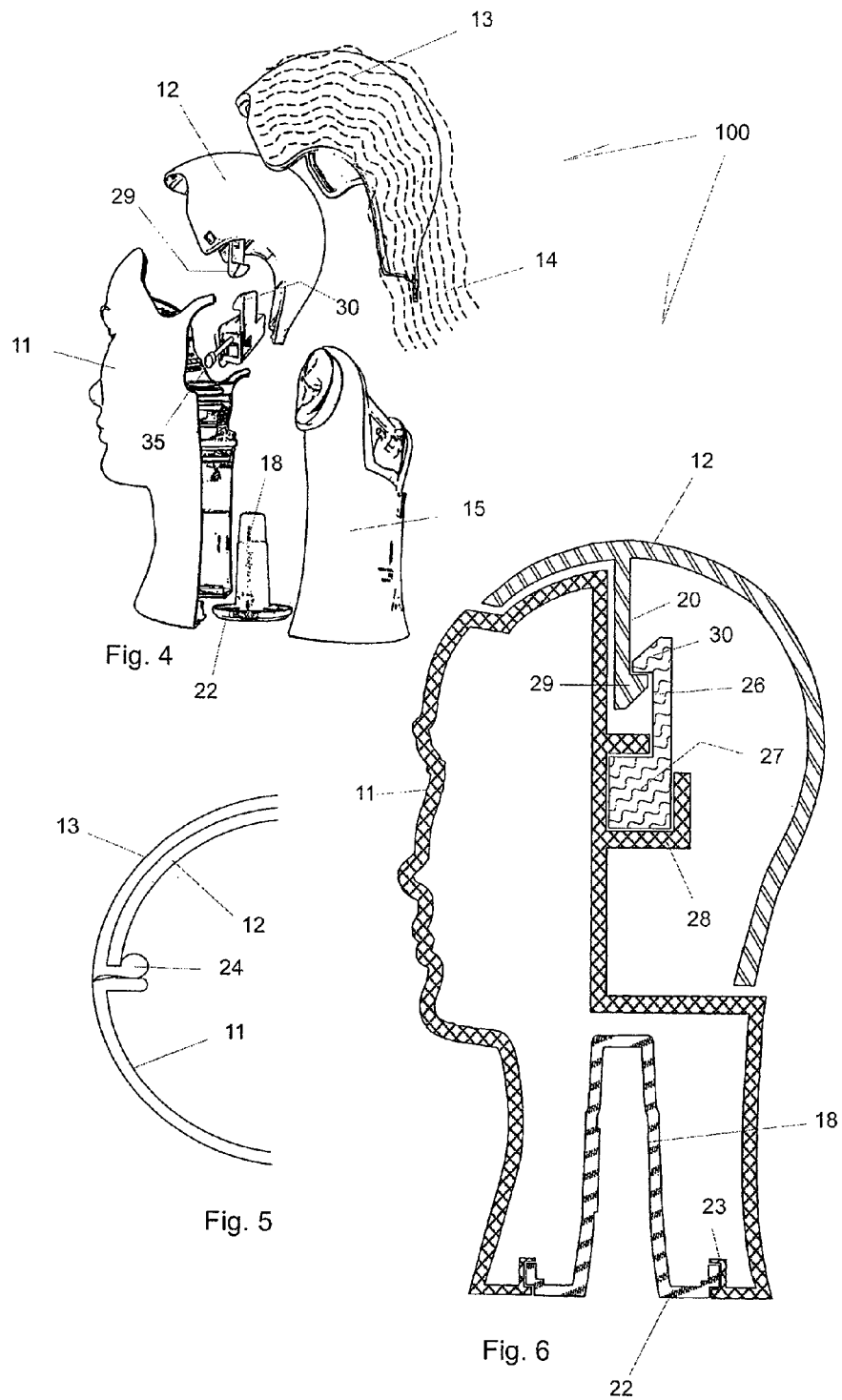
FIG. 4 is a schematic parts-exploded perspective illustration of another hairdressing training headform.
FIG. 5 is a schematic partial cross-sectional elevation of a portion of the headform of FIG. 4.
FIG. 6 is a schematic cross-sectional elevation of the headform of FIG. 4.

In FIGS. 1 to 3 of the accompanying drawings there is depicted schematically a hairdressing training headform 10 comprising a front face portion 11 and a rear neck portion 15. These are secured to one another and a vertex 12 taking the general form of the crown of a human skull completes the overall shape of a human head. These parts would typically be made of ABS plastics material.

A flexible PVC scalp 13 with hair 14 can be fitted over the vertex 12. To this end, the scalp 13 has a peripheral bead 24 which fits under the periphery of the vertex 12 to maintain the scalp stretched taut thereupon.

Extending downwardly from the top of the vertex 12 through a tube 21 formed integrally with the face portion 11 is a hollow shaft 20 having internal thread.

At the base of the headform 10, there is provided a recess 18 with a base 22 into which a key 16 can be inserted. The recess 18 and the base 22 rotate with respect to the headform 10 and is held in a rotatable manner by means of a circular lip 23. The key 16 has splines 17 engaging with the internal surface of the recess 18 which might also have corresponding internal splines.

Extending upwardly from the recess 18 is a threaded rod 19. The threaded rod 19 is received within the threaded shaft 20 with conventional clockwise threads such that upon clockwise rotation of the key 16 and recess 18, the threaded shaft 20 is drawn down so that its periphery presses down upon the bead 24 to sandwich the bead between the vertex 12 and the respective face and neck portions 11 and 15 to secure the scalp in place. Counterclockwise rotation of the key 16 will release the vertex 12 from being headform to enable replacement of the scalp and hair. Secure location of the bead 24 under the periphery of the vertex 12 ensures that trainee hairdressers can pull at the hair 14 without fear of the PVC scalp 13 becoming detached from the headform.

In the embodiment of FIGS. 4 to 6 the means of securing the vertex 12 to a headform 100 is different. In this embodiment, a catch 20 extends downward from the top portion of the vertex 12 and has a pawl 29 at its bottom extremity. Formed integrally with the face portion 11 of the headform is a channel 28 into which a sliding portion 27 of a latch 26 is received. At the upper extremity of the latch 26, there is another pawl 30 which snap-engages over the pawl 29. To this end, the material from which the latch 26 is made is elastically flexible so as to enable deflection of the pawl 30 over the pawl 29 as the vertex 12 is pressed down upon the headform. The pawls 29 and 30 are engaged quite tightly so that the periphery of the vertex 12 bears tightly down upon the lip 24 so that the trainee hairdressers can tug at the hair 14 without fear of the scalp 13 becoming detached during training.

A release pin 35 extends from the sliding portion 27 of the latch 26 and might be presented to the headform exterior via the ear. Manipulation of the release pin will effect lateral transfer of the latch 26 such that the pawl 30 will slide away from pawl 29 to enable release of the vertex 12.

A recess 18 with a base 22 is provided at the base of the headform 100. This can receive a key by which the headform can be attached to a stand.

A further embodiment is depicted in FIGS. 7 to 9. In this embodiment, the means of securing the vertex 12 to the headform 1000 is different again. A gear rack 20—somewhat in the form of a cable tie strip—extends downwardly from a central portion of the vertex 12. The gear rack 20 has ratchet teeth 31 as depicted.

Internally at the base of the headform 11, there is provided a guide tube 32 through which the ratchet teeth 31 pass.

An anchor catch 33 is provided underneath the base of the headform 11 and has an internal pawl 34 which engages with the ratchet teeth 31. The anchor catch 33 is slipped over the tail end of the gear rack 20 as the gear rack is pulled down to draw down on the vertex 12. The pawl 34 locks in position over one o~ the ratchet teeth 31. This downward force on the gear rack 20 forces the periphery of the vertex 12 down upon the lip 24 of the scalp 13 to sandwich the lip between the vertex and facing portions of the headform. In order to release the vertex 12 to remove the scalp 13 and hair 14, the anchor catch 33 can be squeezed to thereby lift the pawl 34 away from the ratchet teeth.

Again, a recess 18 with a base 22 is provided at the base of the headform 1000. This can receive a key by which the headform can be attached to a stand.

The invention claimed is:

1. A hairdressing training aid, comprising: a headform having an exterior with features simulating a face and a neck of a human, said headform including a hollow interior, and a recess rotatable relative to said headform, wherein said recess extends from said exterior into said hollow interior of said headform; a flexible scalp with hair, said flexible scalp having a bead like peripheral lip; a vertex movable relative to said headform and configured to simulate an upper portion of a human skull, said vertex having a periphery with which said peripheral lip of said flexible scalp engages when said flexible scalp is placed over said vertex; and a releasable locking mechanism located within said hollow interior and connecting said headform to said vertex, said releasable locking mechanism operable to move said vertex relative to said headform to tightly engage and disengage said peripheral lip of said flexible scalp between said vertex and said headform when said flexible scalp is placed positioned over said vertex between said vertex and said headform, wherein said releasable locking mechanism includes a first portion extending from said vertex and a second portion extending from said recess, wherein said first portion and said second portion are securely attached to one another and movable relative to one another such that movement of said second portion relative to said first portion moves said vertex and said headform towards or away from each other while said first portion remains securely attached to and operably connected to said second portion.

2. The hairdressing training aid of claim 1, wherein the first and second portions of the locking mechanism comprise a threaded shaft and a threaded rod engaging therewith.

3. The hairdressing training aid of claim 2, wherein relative rotation between the threaded shaft and threaded rod causes relative movement of the vertex with respect to the headform.

4. The hairdressing training aid of claim 1, wherein said recess is configured to receive a key for engaging said recess and operating said second portion connected to said recess.

5. The hairdressing training aid of claim 4, wherein the threaded rod extends from the recess.

6. The hairdressing training aid of claim 3, wherein said recess is securely fastened to one of said threaded rod or said threaded shaft, wherein said recess is rotatable with respect to said headform, wherein rotation of said recess in relation to said headform rotates said one of said threaded rod or said threaded shaft that is securely fastened to said recess, and thereby causing the relative movement of threaded shaft with respect to the threaded rod and the relative movement of said vertex with respect to said headform.

7. The hairdressing training aid of claim 3, wherein said recess in said headform attaches said headform to a stand.

8. The hairdressing training aid of claim 1, wherein the peripheral lip of the scalp protrudes radially inwardly and includes a bead.

9. The hairdressing training aid of claim 1, wherein said recess is fixedly connected to said second portion, wherein rotating said recess in relation to said headform operates said second portion thereby causing said vertex and said headform to move towards and away from each other.

10. A hairdressing training aid, comprising: a headform having features simulating a face and a neck of a human, said headform includes a hollow interior, and a recess rotatable relative to said headform, wherein said recess extends from said exterior into said hollow interior of said headform; a flexible scalp with hair, said flexible scalp having a bead like peripheral lip; a vertex movable relative to said headform and configured to simulate an upper portion of a human skull, said vertex having a periphery with which said peripheral lip of said flexible scalp engages when said flexible scalp is placed over said vertex; a releasable locking mechanism located within said hollow interior and connecting said headform to said vertex, said releasable locking mechanism operable to move said vertex relative to said headform to tightly engage or disengage said peripheral lip of said flexible scalp between said vertex and said headform, wherein said releasable locking mechanism includes a threaded shaft and a threaded rod engaging therewith, wherein one of said threaded shaft or said threaded rod extends from said recess and said other of said threaded shaft or said threaded rod extends from said vertex, wherein said threaded shaft and said threaded rod are securely attached to and operably connected with one another such that movement of said one of said threaded shaft or said threaded rod connected to said recess relative to the other moves said vertex and said headform towards or away from each other while said threaded shaft remains securely attached to and operably connected to said threaded rod.

11. The hairdressing training aid of claim 10, wherein said recess is configured to receive a key for engaging said recess and operating said second portion connected to said recess.

12. The hairdressing training aid of claim 11, wherein the threaded rod extends from the recess.

13. The hairdressing training aid of claim 12, wherein the recess is rotatable with respect to the headform.

14. The hairdressing training aid of claim 10, wherein rotation of said one of said threaded shaft or said threaded rod that is connected to said recess is operated by rotating said recess in relation to said headform, thereby providing the relative movement of said threaded shaft with respect to said threaded rod and moving said vertex with respect to said headform.

15. The hairdressing training aid of claim 14, further including a key, wherein said recess is configured to receive said key for rotating said recess in relation to said headform.

* * * * *